(12) United States Patent
Al-Ani

(10) Patent No.: US 12,724,142 B2
(45) Date of Patent: Sep. 1, 2026

(54) LOW COMPLEXITY MIXED SPACE-TIME RECONSTRUCTION OF SEA WAVE PROFILES FROM RADAR BACKSCATTER

(71) Applicant: Kabushiki Kaisha Toshiba, Tokyo (JP)

(72) Inventor: Mustafa Al-Ani, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

(21) Appl. No.: 18/758,248

(22) Filed: Jun. 28, 2024

(65) Prior Publication Data

US 2026/0003069 A1 Jan. 1, 2026

(51) Int. Cl.
*G01S 13/89* (2006.01)
*G01C 13/00* (2006.01)
*G01S 13/42* (2006.01)

(52) U.S. Cl.
CPC ............ *G01S 13/89* (2013.01); *G01C 13/004* (2013.01); *G01S 13/428* (2013.01)

(58) Field of Classification Search
CPC ........ G01S 13/89; G01S 13/428; G01S 7/414; G01C 13/004; Y02A 90/10
See application file for complete search history.

(56) References Cited

U.S. PATENT DOCUMENTS

| | | | | |
|---|---|---|---|---|
| 2010/0315284 | A1* | 12/2010 | Trizna | G01S 7/18 342/123 |
| 2018/0268677 | A1* | 9/2018 | Drouet | B63B 43/00 |
| 2022/0155069 | A1* | 5/2022 | Previsic | G06F 17/142 |

OTHER PUBLICATIONS

18758248-NPL_2024-07-16.pdf, Al-Ani, Mustafa "Spectral Algorithm in Waves Profiling and Prediction From Radar Backscatter", IEEE Transactions Ono Geoscience and Remote Sensing, vol. 60, 2022 (Year: 2022).*

Nieto Borge et al., "Inversion of Marine Radar Images for Surface Wave Analysis", Journal of Atmospheric and Oceanic Technology, vol. 21, Aug. 2004, pp. 1291-1300.

Al-Ani et al., "Deterministic Sea Waves Prediction Using Mixed Space-Time Wave Radar Data", Journal of Atmospheric and Oceanic Technology, vol. 36, May 2019, pp. 833-842.

Al-Ani et al., "Spectral Algorithm in Waves Profiling and Prediction from Radar Backscatter", IEEE Transactions on Geoscience and Remote Sensing, vol. 60, 2022, 11 pages.

(Continued)

*Primary Examiner* — William Kelleher
*Assistant Examiner* — Kenneth W Good
(74) *Attorney, Agent, or Firm* — Oblon, McClelland, Maier & Neustadt, L.L.P.

(57) ABSTRACT

A method and system for deterministic sea wave profiling and/or prediction. Mixed space-time sampling data of the sea is obtained, where the sampling data is helical in time and space and comprises a plurality of beam waveforms. The sampling data is separated into a plurality of sub-sets of the sampling data, where each sub-set of the sampling data corresponds to a region of the sea. For each sub-set of the sampling data, a sub-set sea model is determined using a subsampled set of wavenumbers. Determining the sub-set sea model is based on the beam waveforms in the corresponding sub-set of the sampling data. The sub-set sea models are up-sampled and then combined to form a complete sea model.

20 Claims, 9 Drawing Sheets

(56) References Cited

OTHER PUBLICATIONS

Ulander et al., "Synthetic-Aperture Radar Processing Using Fast Factorized Back-Projection", IEEE Transactions on Aerospace and Electronic Systems, vol. 39, No. 3, Jul. 2003, pp. 760-776.
Kelly et al., "A Fast Decimation-in-Image Back-Projection Algorithm for SAR", IEEE Radar Conference, May 2014, pp. 1046-1051.
Tucker et al., "Waves in Ocean Engineering", Elsevier Ocean Engineering Book Series, vol. 5, Chapter 7, 2001, 57 pages.

* cited by examiner

LOW COMPLEXITY MIXED SPACE-TIME RECONSTRUCTION OF SEA WAVE PROFILES FROM RADAR BACKSCATTER

FIELD

Embodiments described herein relate to the field of sea wave prediction and in particular to deterministic sea wave prediction using mixed space-time sampling data.

BACKGROUND

Short-term deterministic sea wave prediction (DSWP) aims to predict the actual profile of the sea surface and its evolution, typically in the timescale of 60 seconds ahead, unlike traditional statistical estimation of sea wave properties.

Major applications of wave prediction is the control of floating platform including wind turbines and wave energy converters for the aim of increasing their efficiency and reducing their cost of energy.

DSWP requires real-time measurements of the surrounding sea surface to determine the underlying phase-resolved spectral coefficients that can be propagated/shifted in time and space and produce the future sea surface elevation at the location of interest (e.g., the wind turbine platform location). For example, in situ observations using wave buoys have the advantage of being direct measurements of the sea surface elevation. However, such point measurements are spatially very sparse, and their deployment is not feasible in certain places (e.g., around wind farms).

Remote sensing technologies are appealing in general as they can collect thousands of point measurements of a wave field. However, the challenge with their data is that they are typically an indirect representation of the sea surface elevation.

For example, one of the properties of rotating radars is that they do not provide all of the measurements comprising a scan instantaneously nor in a Cartesian grid. The antenna mechanically rotates to scan the sea surface, and hence each beam in a scan has a different time stamp, leading to the radar measurements to be of mixed space-time polar nature. Therefore, 3DFFT provides compromised results based on time-smeared approximated and/or interpolated data, with errors subjective to the prevailing conditions and the choice of the interpolation/approximation function.

Existing mixed space-time approaches are computationally complex. Recent approaches require in the order of O(R) operations, where R is the number of radar beams, to determine each spectral coefficient in the sea surface model. In a typical setting, a sea model can have in the order of $O(10^6)$ spectral coefficients, R can be in the order of $O(10^3)$ per scan, and the number of scans used to build the sea model can be around O(10). Thus, to realise a real-time sea wave profiling radar system, relatively complex processing units are required.

Thus, there is a need for improved methods and systems for DSWP.

BRIEF DESCRIPTION OF DRAWINGS

In the following, embodiments will be described with reference to the drawings in which.

DETAILED DESCRIPTION

Figure 1:
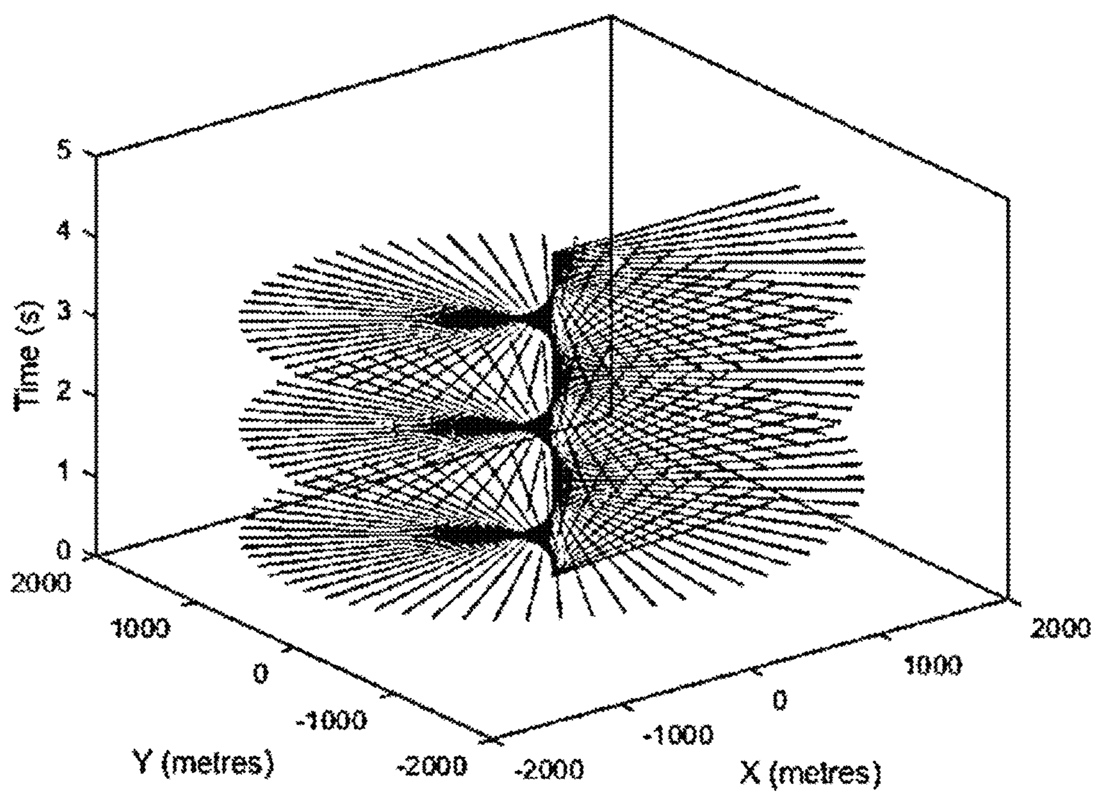
FIG. 1 illustrates the helical nature of the radar data in time and space.

According to a first aspect there is provided a method for deterministic sea wave profiling and/or prediction is provided, the method comprising: obtaining mixed space-time sampling data of the sea, wherein the sampling data is helical in time and space and comprises a plurality of beam waveforms; separating the sampling data into a plurality of sub-sets of the sampling data, wherein each sub-set of the sampling data corresponds to a region of the sea; for each sub-set of the sampling data, determining a sub-set sea model, using a subsampled set of wavenumbers, based on the beam waveforms in the corresponding sub-set of the sampling data; up-sampling the sub-set sea models; and combining the up-sampled sub-set sea models to form a complete sea model.

Generating sea models requires a large number of operations to be performed. It has been realized that, by separating the sampling data into sub-sets and correspondingly sub-sampling the wavenumbers, the number of operations can be reduced. This is because each sub-set sea model can be calculated from a corresponding smaller subset of the data.

Furthermore, using a subsampled set of wavenumbers to generate sub-set sea models, the sub-set sea models can later be up-sampled and then combined to generate a complete sea model (e.g., at a desired size/resolution) whilst reducing the number of operations being performed.

By separating the sampling data into sub-sets, each sub-set can be processed independently. Thus, the sampling data can be processed as a scan progresses instead of having to wait for the whole scan to complete. This enables the sea model to be obtained in real-time.

It has been found that, by separating the sampling data into sub-sets, and then determining sub-set sea models for each of the sub-sets, the wavenumbers used during the determination of the sub-set sea models can be subsampled whilst enabling an efficient combination of the sub-set sea models to arrive at the complete sea model. This results in a reduced order of operations required to determine each sub-set sea model.

Obtaining the mixed space-time sampling data may comprise receiving the sampling data from, for example, a rotating sensor (e.g., rotating radar sensor, rotating Lidar sensor etc.).

Separating the sampling data into a plurality of sub-sets of the sampling data may involve dividing the sampling data into a plurality of sub-sets comprising a plurality of neighbouring beam waveforms.

The sub-set sea models may be determined based on the standard linear oceanographic wave model of the sea surface. For example, the sub-set sea models may be determined based on standard linear oceanographic wave mode of the sea surface in polar coordinates.

By up-sampling the sub-set sea models prior to the combination (to form the complete sea model), the sub-set sea models can be determined by using even less wavenumbers, thereby significantly reducing the number of operations required to generate the sub-set sea models. This is because, after the sub-set sea models are determined (using a subsampled set of wavenumbers), they are up-sampled before they are combined into the complete sea model.

Separating the sampling data into sub-sets provides a more efficient up-sampling of the sub-set sea models.

For example, the beams may be divided across the azimuth and radius directions into segments (i.e., annular wedges). The sea models wavenumbers may be subsampled in both dimensions.

In an embodiment, up-sampling each sub-set sea model comprises up-sampling each sub-set sea model in the frequency domain.

Up-sampling a signal can be performed efficiently using a Fast Fourier Transform (FFT). This involves taking the FFT of the signal, zero-padding the resulting coefficients, and performing an inverse FFT on the zero-padded coefficients to attain the up-sampled signal.

When up-sampling high frequency signals, to appropriately zero-pad the FFT coefficients, they can be frequency-shifted down (e.g., to baseband) beforehand. After the inverse FFT is performed, the signal can be frequency-shifted back to its (high) frequency location. The frequency-shifting is referred to as "modulation" herein.

In other words, modulation means to shift the spectrum of the sub-set sea models to, for example, zero. Thus, for example, when two-dimensional FFT is performed on the sub-set sea model, its spectrum will be centred at zero. This can improve the efficiency of up-sampling.

Up-scaling in the frequency domain may comprise, for each sub-set sea model: performing a Fourier Transform on the sub-set sea model to obtain a sub-set sea elevation representation, optionally modulating a sub-set sea elevation representation, zero-padding the sub-set sea elevation representation, performing an inverse Fourier Transform on the zero-padded sub-set sea elevation representation and optionally demodulating the sea model.

In an embodiment, the sub-set sea models are up-sampled by a factor of two.

In an embodiment, combining the sub-set sea models to form a complete sea model comprises iteratively summing four adjacent up-sampled sub-set sea models. In an embodiment, the sampling data is separated into $L^2$ sub-sets of the sampling data, where $L=2^d$ and d is an integer number.

Each sub-set of the sampling data may comprise substantially the same number of beam waveforms.

For example, the sampling data may be separated/divided into 2L wedges and L/2 annular wedges per wedge.

In an embodiment separating the sampling data into one or more sub-sets of the sampling data comprises separating the sampling data along the azimuth axis into two or more wedges.

In an embodiment, the method further comprises, for each of the two or more wedges, separating the wedge along the radial axis into two or more annular wedges such that each sub-set of the sampling data is an annular wedge.

In an embodiment, the sampling data is separated into 2L wedges and L/2 annular wedges per wedge, where L is an integer number.

In an embodiment, the method further comprises determining a set of wavenumbers based on a pre-determined size and/or pre-determined resolution of the complete sea model to be formed and subsampling the set of wavenumbers to form the subsampled set of wavenumbers.

The set of wavenumbers may be subsampled by a factor of L.

In an embodiment, determining the sub-set sea model comprises solving a linear oceanographic wave model for the corresponding sub-set of the sampling data.

The number of operations needed to solve the linear oceanographic wave model can be reduced by using FFTs across the beam waveforms and using interpolation to approximate the summation across each beam waveform.

In an embodiment, the sampling data comprises radar data obtained from a rotating radar scanner.

Alternatively, or additionally, the sampling data may comprise light detection and ranging (LIDAR) data obtained from a rotating LIDAR scanner and/or sampling data obtained from any other rotating scanner.

Any of the methods described herein may be computer implemented.

In a second aspect there is provided a computer program comprising computer program code which, when executed on a processing system, causes the processing system to perform all the steps of the method for deterministic sea wave profiling and/or prediction.

In a third aspect there is provided a system for deterministic sea wave profiling and/or prediction using mixed space-time sampling data of the sea when the sampling data is helical in time and space and comprises a plurality of beam waveforms, the system comprising a processing system configured to: obtain the mixed space-time sampling data of the sea; separate the sampling data into a plurality of sub-sets of the sampling data, wherein each sub-set of the sampling data corresponds to a region of the sea; for each sub-set of the sampling data, determine a sub-set sea model, using a subsampled set of wavenumbers, based on the beam waveforms in the corresponding sub-set of the sampling data; up-sample the sub-set sea models; and combine the up-sampled sub-set sea models to form a complete sea model.

In an embodiment, the processing system is configured to up-sample each sub-set sea model by up-sampling each sub-set sea model in the frequency domain.

In an embodiment, the sub-set sea models are up-sampled by a factor of two.

In an embodiment, the processing system is configured to combine the sub-set sea models to form a complete sea model by iteratively summing four adjacent up-sampled sub-set sea models.

In an embodiment, the sampling data is separated into $L^2$ sub-sets of the sampling data, where $L=2^d$ and d is an integer number.

In an embodiment, the processing system is configured to separate the sampling data into one or more sub-sets of the sampling data by separating the sampling data along the azimuth axis into two or more wedges.

In an embodiment, the processor is further configured to, for each of the two or more wedges, separate the wedge along the radial axis into two or more annular wedges such that each sub-set of the sampling data is an annular wedge.

In an embodiment, the processing system is configured to separate the sampling data into 2L wedges and L/2 annular wedges per wedge, where L is an integer number.

In an embodiment, the processing is further configured to determine a set of wavenumbers based on a pre-determined size and/or pre-determined resolution of the complete sea model to be formed and subsample the set of wavenumbers to form the subsampled set of wavenumbers.

In an embodiment, the processing system if configured to determine the sub-set sea model comprise solving a linear oceanographic wave model for the corresponding sub-set of the sampling data.

In an embodiment, the sampling data comprises radar data obtained from a rotating radar scanner.

In an embodiment, the system further comprises a rotating radar scanner configured to obtain the sampling data.

Deterministic Sea Wave Prediction (DSWP) is a relatively new maritime technology that aims to predict the actual profile of the sea surface and its evolution tens of seconds in advance based on nearby measurements. Applications of DSWP include the control of floating platforms, such as floating wind turbines, and decision support for health and safety in critical offshore operations.

DSWP requires local measurements of the sea surface to provide a prediction in the location of interest. Mechanically rotating range radars represent a convenient tool to measure the nearby sea surface for a range of around 1-3 km. The typical approach to extracting the sea surface from the radar return is based on three-dimensional Fast Fourier Transforms (3DFFT). As the data is helical in time and space due to the radar antenna rotation, an approximation and interpolation is required to bring the data to a Cartesian distribution in the typical approach.

It has been realized that when sampling data for DSWP is transformed into a Cartesian distribution, this can introduce considerable error in many cases.

Herein is disclosed a new efficient approach that can overcome this problem by fitting the data directly in their originally captured locations. This approach is characterised by its low computational complexity using hierarchical data segmentation. The proposed approach can compute each spectral coefficient in the sea surface model using $$O\left(\max\left\{\frac{R}{L}, \log_2 L\right\}\right)$$

operations, where R is the number of radar beams and L is a number that can be selected by, for example, the user, and set as high as R. The approach provided herein leads to a significant reduction in the computing complexity (e.g., central processing unit (CPU) and/or graphics processing unit (GPU)) to build a real-time system.

In summary, the proposed methods and systems constitute an accurate and low computational approach than can realise a seagoing system operating in real time using a fewer number of off-the-shelf processing hardware.

Methods and systems provided herein enable the processing of radar measurements in their natural helical distribution with no approximation and/or interpolation.

Additionally, the methods and system described herein enable a computationally efficient mixed space-time approach for sea surface extraction from radar return, which can overcome the helical nature of the radar data.

In some embodiments, the methods and system provided herein reduce the order of arithmetic operations by $L=2^d$ when compared with current state-of-the-art mixed space-time approaches, where d is an integer number that can be selected by, for example, a user. The reduction in operations required to perform DWSP also reduces the CPU/GPU complexity such that a real-time system can be built to perform DWSP in real-time. Similarly, the reduction in operations required to perform DWSP enables faster sea model extraction from rotating remote sensing measurements, such as radar and Lidar.

One approach to obtain the sampling data is to use a rotating radar. Non-coherent X-band radars constitute a very attractive remote sensing technology because of their wide availability and affordability. These radar systems transmit pulses of short durations, as low as 20 ns achieving 3.0 m range resolution, while rotating 360 degrees and providing a scan of the wavefield around the radar within a range of around 1-3 km. The radar data is therefore natively helical in space and time.

FIG. 1 illustrates the helical nature of the radar data in time and space.

A spectral approach based on three-dimensional Fast Fourier Transform (3DFFT) is the typical algorithms for wave profile extraction for radar return. However, this approach relies on approximation/interpolation that compromises the accuracy of the results, especially for slower rotating large radars and cases with significant shadowing where large gaps in the data are present due to higher waves in the line sight to the radar.

Mixed space-time techniques can overcome these drawbacks. In particular, mixed space-time techniques process the data in their captured, helical in space and time, locations with no interpolation or approximation. The major disadvantage of these inversion algorithms is their high computational expense. The computational effort of a reconstruction algorithm is crucial for the wave profiling radar to provide the sea surface measurements in real-time with no delays, which is key to its function.

One of the properties of typical radars is that they do not provide all of the measurements comprising a scan instantaneously nor in a Cartesian grid. The antenna mechanically rotates to scan the sea surface, and hence each beam in a scan has a different time stamp, leading to the radar measurements to be of mixed space-time polar nature. Therefore, 3DFFT provides compromised results based on time-smeared approximated and/or interpolated data, with errors subjective to the prevailing conditions and the choice of the interpolation/approximation function.

The proposed approach can readily process the radar measurements in their natural distribution with no approximation, interpolation or extra computational cost.

Existing mixed space-time approaches are computationally complex. The state-of-the-art approach requires O(R) operations, where R is the number of radar beams, to determine each spectral coefficient in the sea surface model.

The proposed approach also provides a computationally efficient mixed space-time algorithm that can determine the sea model with significantly reduced computational complexity.

The standard linear oceanographic wave model of the sea surface h(x,y,t) at the spatial coordinates (x,y) and time t is given by:

$$h(x, y, t) = \mathcal{R}\left\{\sum_{q=1}^{Q}\sum_{n=1}^{N} C_{n,q} e^{\left(-i\left(k_n x + k_q y - \omega\left(k_n, k_q\right)t\right)\right)}\right\} \tag{1}$$

where $C_{n,q}$ is the complex spectral coefficient at the wavenumber $(k_n,k_q)$ and its angular frequency $\omega(k_n,k_q)$ according to the dispersion relationship. $\mathcal{R}\{\ldots\}$ is the real part operator, and $N\times Q$ is the size of the model. The wavenumbers are uniformly distributed on a Cartesian grid with size and resolution determined by the size and resolution of the wavefield to be represented.

Figure 2:
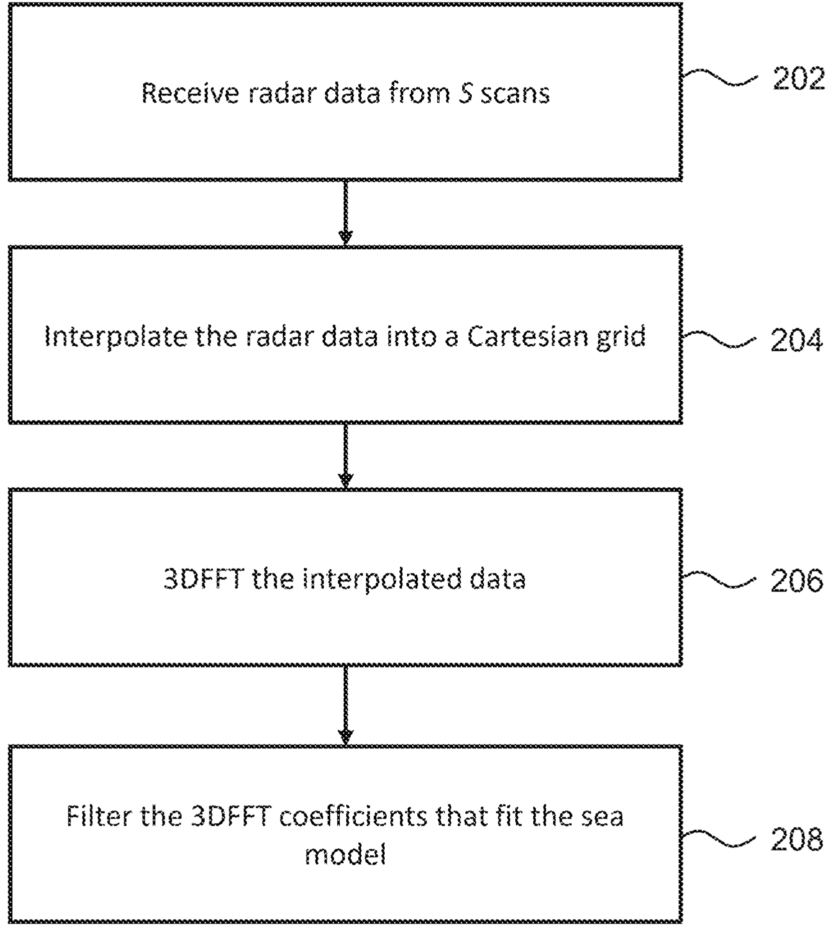
FIG. 2 shows a flowchart of a standard 3DFFT-based algorithm.

FIG. 2 shows a flowchart of a standard 3DFFT-based algorithm. In step 202, the radar data (i.e., sampling data from the radar) is received from S scans. In step 204, the radar data is interpolated into a Cartesian grid (i.e., Cartesian coordinate system). In step 206, a 3DFFT is applied to the interpolated data and, in step 208, the 3DFFT spectral coefficients that fit the sea model are filtered.

Determining the spectral coefficients of equation (1) provides a representation of the sea surface elevation. Radar backscatter scans give only partial and distorted information about the sea surface, mainly because of the geometric shadowing effects. Therefore, multiple radar scans are typically used to determine these coefficients.

In the typical approach using 3DFFT, the data from s=O(10) scans is interpolated/approximated from their helical distribution to a Cartesian grid. The 3DFFT outcome is band-pass filtered in all dimensions to only pass the wavenumber-angular frequency points present in the sea model. However, the 3D outcome of the 3DFFT (over two wavenumbers axes and angular frequency axis) enables the identification of the dispersion relationship between the wavenumbers $(k_n,k_q)$ and angular frequencies $\omega(k_n,k_q)$ that represent the prevailing wavefield and hence can be used in the sea model of equation (1). For example, this can be achieved by fitting a theoretical dispersion relationship surface to the coefficients with the highest energy.

Figure 3:
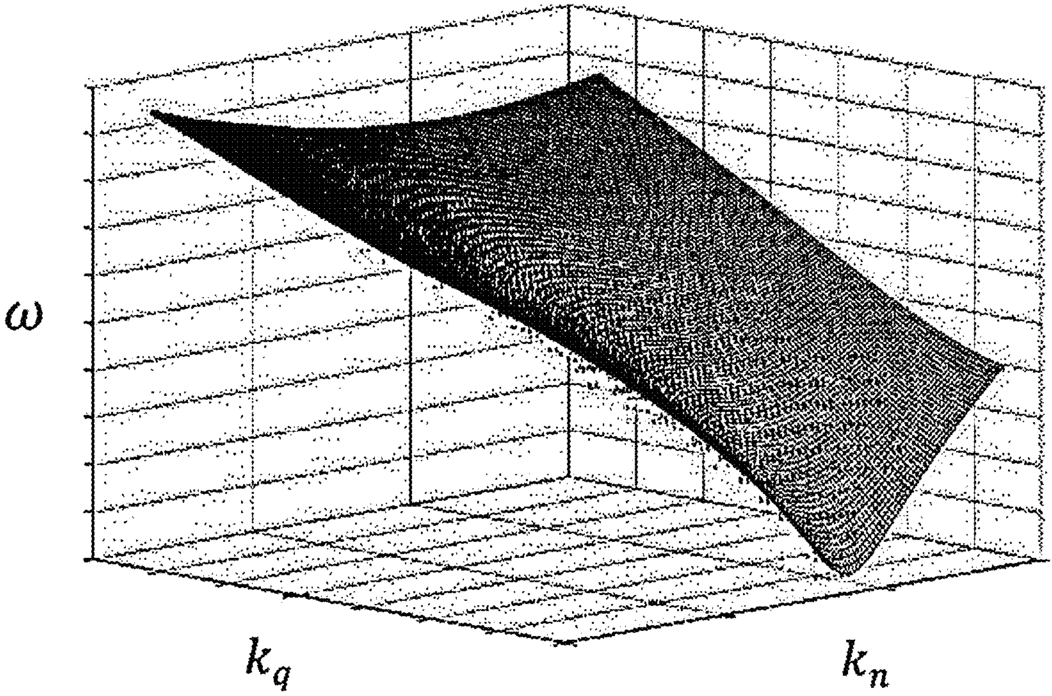
FIG. 3 shows 3DFFT spectral coefficients with the highest energy, and a corresponding dispersion relationship surface in three-dimensional space.

FIG. 3 shows 3DFFT spectral coefficients with the highest energy and corresponding dispersion relationship surface in three-dimensional space.

In other embodiments, two-dimensional FFT (2DFFT) may be applied to the interpolated Cartesian grid of each scan, then modulated by the scan time and the angular frequencies $\omega(k_n,k_q)$ once the dispersion relationship is identified. The dispersion relationship depends on the water depth and the sea surface currents which do not change frequently during operation. In this case, the 3DFFT is carried out at the setup stage and sparsely afterwards as a background task during operation to identify any change in the dispersion relationship. In some embodiments, the radar data may be smoothed with respect to its range and direction before interpolation.

For mixed space-time reconstruction, the data from the radar scans is used directly as follows. First, the linear sea model at spatial location of polar coordinate $(\nu,\varphi)$ and time t is re-written as:

$$h(\nu,\vartheta,t)=\sum_{q=1}^{Q}\sum_{n=1}^{N}[a_{n,q}\alpha_{n,q}(\nu,\vartheta,t)+b_{n,q}\beta_{n,q}(\nu,\vartheta,t)] \quad (2)$$

where:

$$a_{n,q}=\mathcal{R}\{C_{n,q}\} \quad (3)$$

$$\alpha_{n,q}(\nu,\vartheta,t)=\cos(k_n\nu\cos(\vartheta)+k_q\nu\sin(\vartheta)-\omega_{n,q}t) \quad (4)$$

$$b_{n,q}=\mathcal{I}\{C_{n,q}\} \quad (5)$$

$$\beta_{n,q}(\nu,\vartheta,t)=\sin(k_n\nu\cos(\vartheta)+k_q\nu\sin(\vartheta)-\omega_{n,q}t) \quad (6)$$

With a radar scan of R radial beams and M sampling points per beam, let $$\{\nu_m\}_{m=1}^{M}$$

be the sampling points per beam, $$\{\vartheta_r\}_{r=1}^{R}$$

be the directions of the beams, and $$\{t_r\}_{r=1}^{R}$$

be the teime stamps of the beams from their scans's start time. The start time of the $s^{th}$ scan is denoted by Ts. Estimates of the coefficients pairs $(\hat{a}_{n,q,s},\hat{b}_{n,q,s})$ based on the measurements of the $s^{th}$ scan $$\vartheta_s(\nu_m,\vartheta_r,t_r)_{m=1,r=1}^{m=M,r=R}$$

can be determined by solving the following minimisation tasks sequentially:

$$\min_{a_{n,q},\,b_{n,q}}\sum_{r=1}^{R}\sum_{m=1}^{M}[a_{n,q}\alpha_{n,q}(\nu_m,\vartheta_r,t_r)+b_{n,q}\beta_{n,q}(\nu_m,\vartheta_r,t_r)-\nu_m\vartheta_s(\nu_m,\vartheta_r,t_r)]^2 \quad (7)$$

The solution is given by:

$$\begin{bmatrix}\hat{a}_{n,q,s}\\ \hat{b}_{n,q,s}\end{bmatrix}=H^{-1}g \quad (8)$$

where:

$$H=\sum_{r=1}^{R}\sum_{m=1}^{M}\begin{bmatrix}\alpha_{n,q}(\nu_m,\vartheta_r,t_r)\\ \beta_{n,q}(\nu_m,\vartheta_r,t_r)\end{bmatrix}[\alpha_{n,q}(\nu_m,\vartheta_r,t_r),\beta_{n,q}(\nu_m,\vartheta_r,t_r)] \quad (9)$$

$$g=\sum_{r=1}^{R}\sum_{m=1}^{M}\begin{bmatrix}\alpha_{n,q}(\nu_m,\vartheta_r,t_r)\\ \beta_{n,q}(\nu_m,\vartheta_r,t_r)\end{bmatrix}\vartheta_s(\nu_m,\vartheta_r,t_r) \quad (10)$$

Direct computations for this minimization task can be prohibitively expensive as the computations required per coefficient pair are in the order of O(MR). Currently, this order of operations is much too high for any realistically sized problems. Reduced complexity approaches have been proposed by capitalizing on the assumption of fixed time stamps in the samples of a single radar beam and using a zero-padded one-dimensional FFT (1DFFT). However, this approach is still computationally demanding as it requires O(R) operations to compute each spectral coefficient in the sea surface model.

Figure 4:
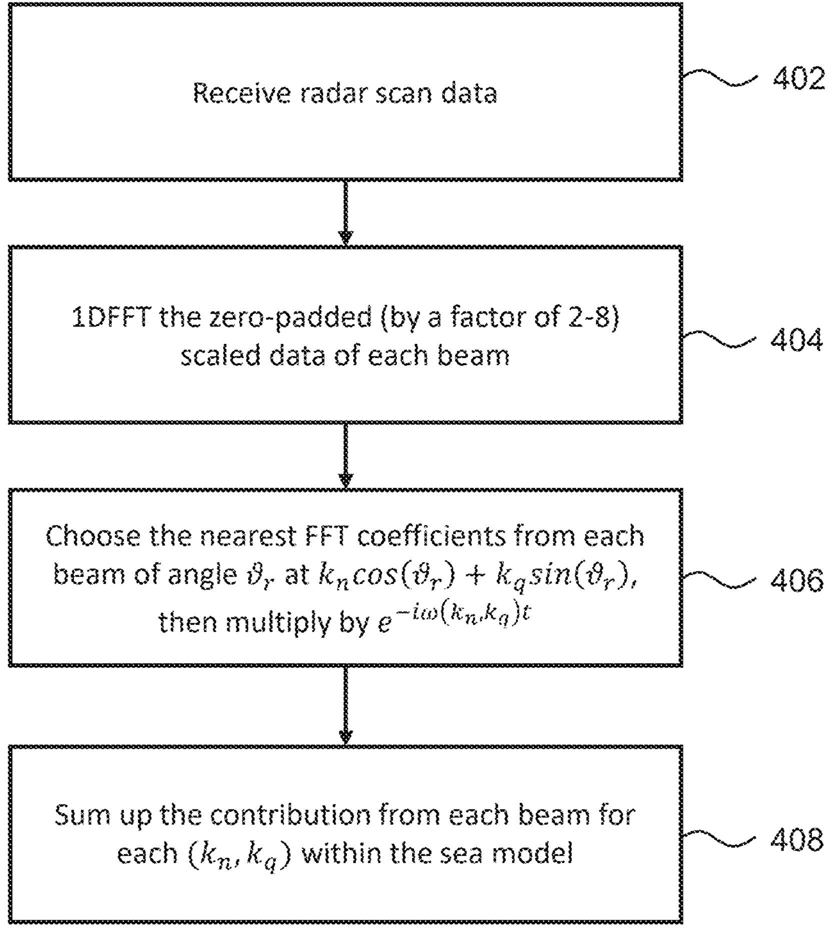
FIG. 4 shows a flowchart of the standard mixed space-time algorithm.

FIG. 4 shows a flowchart of the standard mixed space-time algorithm. In step 402, radar scan data is received. In step 404, a 1DFFT is performed on zero-padded (e.g., by a factor of between 2 and 8) scaled data of each beam. In step 406, the nearest FFT coefficients from each beam of angle $\varphi_r$ at $k_n\cos(\varphi_r)+k_q\sin(\varphi_r)$ is chosen and then multiplied by $\exp(-i\omega(k_n,k_q)t)$. In step 408, the contribution from each beam for each$(k_n,k_q)$ within the sea model is summed.

The methods and systems proposed herein can reduce the computational complexity by several folds (e.g., by $O(\max\{R/L,d\})$, where $L=2^d$ and d is an integer number). To obtain the solution for equations (7) and (8), an exemplary algorithm according to an embodiment is provided in FIG. 5 and generally follows three stages.

Figure 5:
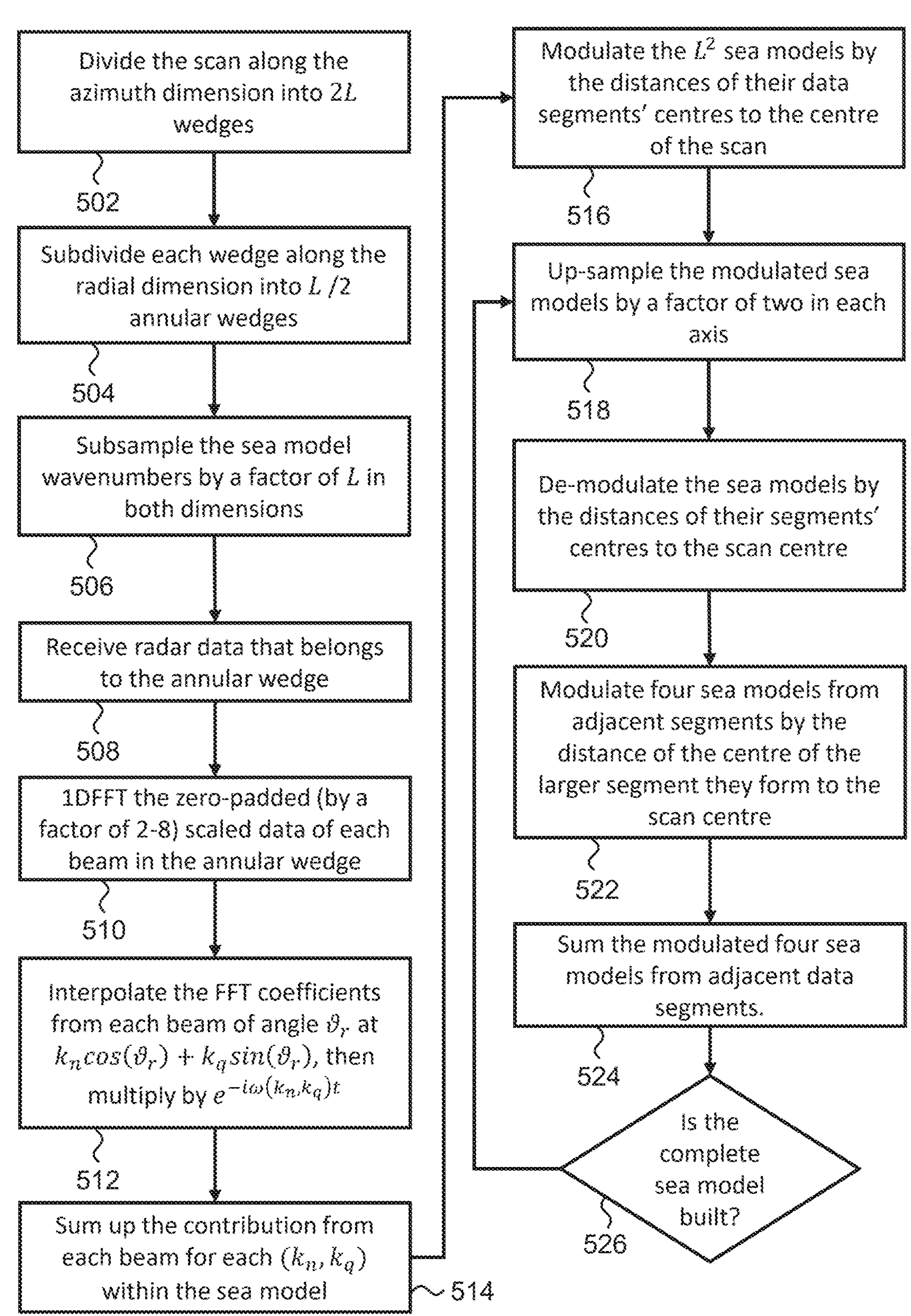
FIG. 5 describes a flowchart for a low-complexity mixed space-time method, according to an embodiment.

FIG. 5 describes a flowchart for a low-complexity mixed space-time method, according to an embodiment.

A first stage includes steps 502, 504 and 506, and is the pre-setup stage prior to processing the data. In step 502, the scan is divided along the azimuth axis into 2L wedges, where $L=2^d$, and d is an integer positive number. Each wedge has equal size of $\ell=R/(2L)$ beams. In step 504, each wedge is divided along the radial axis into L/2 annular wedges, referred to here as 'segments'.

In step 506, the sea model wavenumbers are subsampled by a factor L in both dimensions.

Returning to equations (1) and (2), subsampling the sea model wavenumbers can be achieved by reducing the range of values for the indices q and n. For example, a set of wavenumbers can be chosen based on a desired complete sea model to be formed/generated. Typically, the indices q and n are then based on the set of wavenumbers. By subsampling the wavenumbers, the range of values for q and n are reduced, thereby reducing the number of operations required for each sub-set sea model.

In an alternative arrangement, the sea model wavenumbers are subsampled by a factor lower than L in both dimensions.

Figure 6:
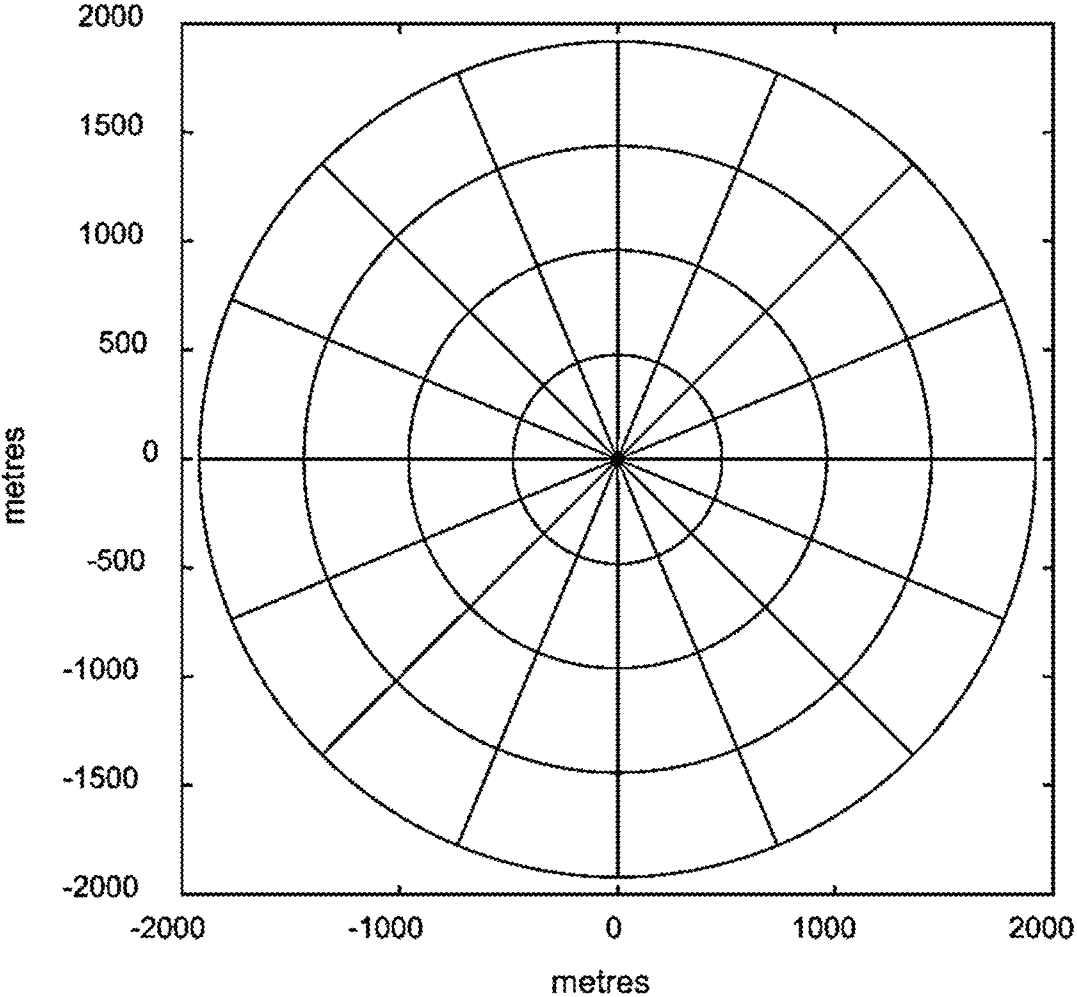
FIG. 6 shows an example of radar data segmentation into annular wedges.

Choosing d can be achieved on a trial-and-error testing to find a suitable and/or preferable number for the prevailing setup. For example, FIG. 6 shows an example of radar data segmentation into annular wedges with d=3, including 16 wedges and four annular wedges per wedge.

A second stage includes steps 508, 510, 512 and 514 and is where the processing of the data begins. In step 508, the data from each of the $L^2$ segments is used to build $L^2$ subsampled (sub-set) sea models. Each of the wedges can be processed independently, hence the data can be processed as the scan progresses instead of waiting for a whole scan to complete to commence the process. In step 510, a 1DFFT of zero-padded (e.g., by a factor of between 2 and 8) scaled data is performed for each beam in the annular wedge. In step 512, the FFT coefficients from each beam of angle $\varphi_r$ are linearly interpolated at $k_n \cos(\varphi_r)+k_q \sin(\varphi_r)$, and then modulated by their beam time by multiplying by $\exp(-i\omega(k_n,k_q)t)$ for each subsampled wavenumber $(k_n,k_q)$ within each subsampled sea model. In step 514, the contribution from each beam for each subsampled wavenumber $(k_n,k_q)$ within a subsampled sea model is added.

The outcome of the second stage is $L^2$ subsampled sea models that correspond to $L^2$ segments. The order of operations per spectral coefficient required for the second stage is O(R/L).

The third stage is a recursive process that repeats d times. In step 516, the subsampled sea models are modulated by the distances of their data segments centres to the centre of the scan. In step 518, the modulated subsampled sea model is up-sampled by a factor of two in each axis. Other up-sampling factors may also be used. Preferably, the up-sampling factor is two to improve the efficiency of the algorithm.

In step 520, the sea models are de-modulated by the distances of their corresponding data segments centres to the scan centre. In step 522, four sea models from adjacent data segments that belong to two adjacent wedges are modulated by the distance of the centre of the larger segment they form to the scan centre. In step 524, the four sea models are summed together.

The third stage is repeated from step 518 until the complete sea model is built. The number of operations required per spectral coefficient for the third stage is O(d).

The proposed approach has been tested on simulated radar measurements. Synthetic radar measurements were generated by applying geometric shadowing and intensity saturation on simulated wavefield data. There are indeed other sources of imperfections in real radar measurements, but geometric shadowing is the most dominant with major impact on the imaging mechanism and would suffice for the purpose of the comparison. A Joint North Sea Wave Project (JONSWAP) spectrum with a spread function parameter of 12 was used. The significant wave height was set to 2.9m and mean period was set to 6.8 seconds. The maximum radar range was set to 2400m, with radial and angular resolutions of 3m and 0.0031 rad, respectively. The deep-water dispersion relationship was used. It was assumed that the unreliable and dead zone around the radar, which is mainly due to the saturation in the backscatter, had a radius of 600m. This zone is excluded in the estimation of the model coefficients. The geometric shadowing was introduced to the data by defining the line of sight between the radar at height $\mathcal{H}$ and the sea elevation $h(\nu)$ at radial distance $\nu$ in each direction. The sea elevation at $\nu$ is shadowed from the antenna if there is $h(\acute{\nu})$, $\acute{\nu}<\nu$ in the same azimuthal angle blocking the line of sight. In other words, the sea elevation $h(\nu)$ is forced to zero if $h(\acute{\nu})>H(\nu)+(\nu-\acute{\nu})(\mathcal{H}-h(\nu))/\nu$. The radar height $\mathcal{H}$ was set to 30m above the sea level and assumed to be at a fixed position. The radar rotation period was set to 2.5 seconds. 16 scans were used to build the sea model. In this example, according to the proposed approach, each scan was subdivided using L=4.

Figure 7:
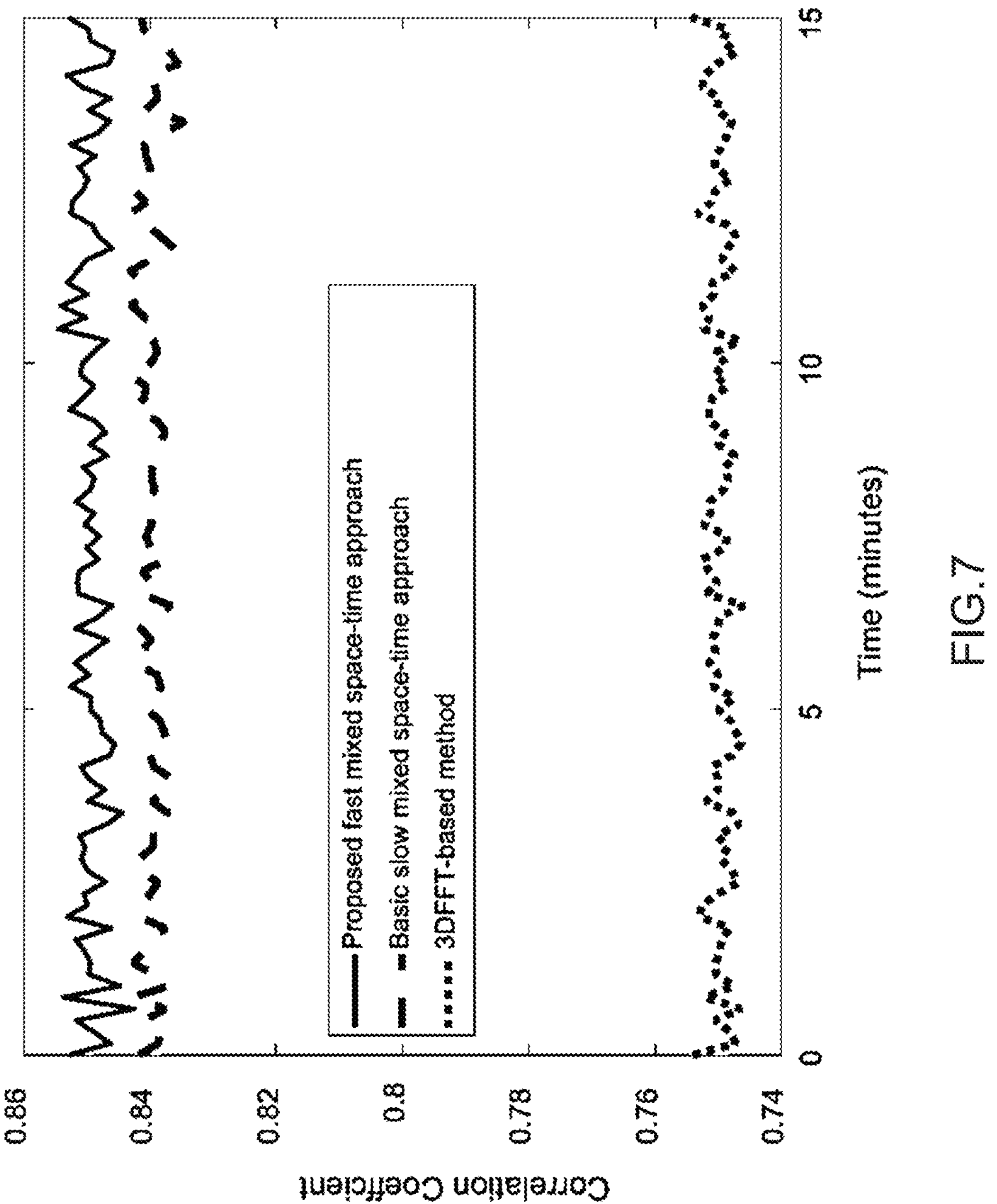
FIG. 7 shows the correlation coefficients between the true sea surface and three different radar extracted sea surfaces.

FIG. 7 shows the correlation coefficient between the true sea surface and radar extracted sea surface using the low-complexity mixed space-time approach as shown in FIG. 5 (solid line), the basic mixed space-time approach as shown in FIG. 2 (dotted line), and a 3DFFT-based approach as shown in FIG. 4 (dashed line).

In FIG. 7, the spatial correlation between the radar extracted sea surfaces and the true sea surfaces is shown over 20 minutes. The results are an average of 85%, 84% and 75% for the proposed mixed space-time algorithm, existing mixed space-time algorithm, and 3DFFT-based approach, respectively.

Figure 8:
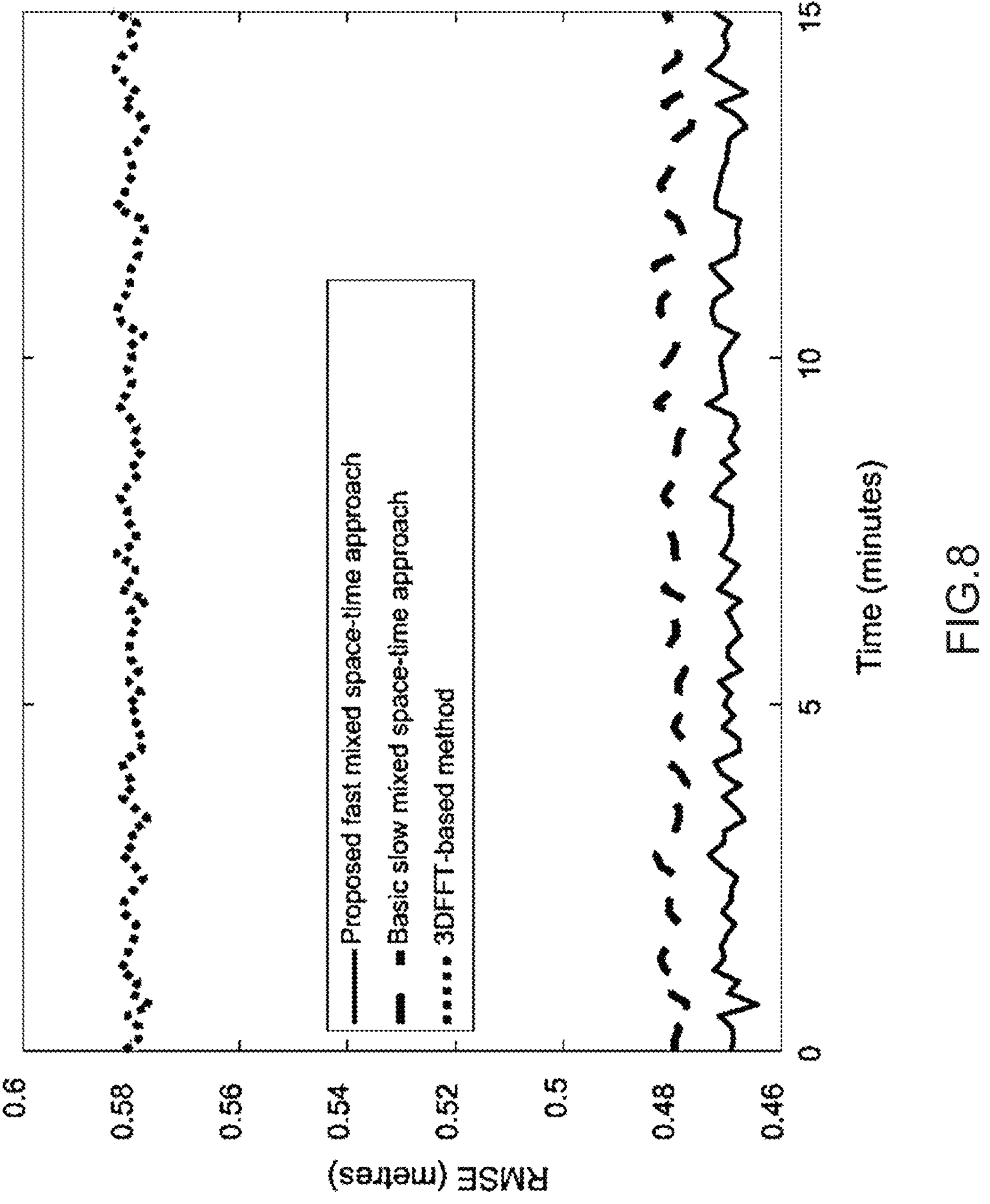
FIG. 8 shows the correlation coefficients between the true sea surface and three different radar extracted sea surfaces.

FIG. 8 shows the correlation coefficient between the true sea surface and radar extracted sea surface using the low-complexity mixed space-time approach as shown in FIG. 5 (solid line), the basic mixed space-time approach as shown in FIG. 2 (dotted line), and 3DFFT-based approach as shown in FIG. 4 (dashed line).

In FIG. 8, the root-mean squared error (RMSE) between the radar extracted sea surfaces and the true sea surfaces is shown over 20 minutes. The proposed approach provides over 12% improvement in the reconstruction accuracy compared with the standard 3DFFT-based algorithm, and it provides three times faster processing compared with the existing mixed-space-time approaches.

On a computer with an Intel Core i7-10710U™ CPU @ 1.10 GHz, the execution time to build the sea model using the existing approach was found to be 15 seconds per scan (i.e., 240 seconds for the 16 scans), whereas the proposed method required 4.5 seconds per scan (i.e., 72 seconds for the 16 scans).

The proposed method allows data segmentation of the scan data which can significantly reduce memory allocation in parallel processing. The algorithm can lead to savings in the computational cost and a reduction in hardware complexity in sea wave profiling radar systems. The algorithm proposed above can process the radar data live as they are captured instead of waiting for the whole scan to be complete to interpolate into a Cartesian grid in the standard 3DFFT-based approach. The algorithm can also be applied to measurements from, for example, rotating Lidar scanners.

In the proposed algorithm described in FIG. 5, the coefficients are extracted for a (2D) sea model with known dispersion relationship. However, it will be appreciated that, in other embodiments, the algorithm can provide coefficients over a three-dimensional space (two wavenumber axes and angular frequency axis) which allows for the identification of the dispersion relationship between the wavenumbers $(k_n,k_q)$ and angular frequencies $\omega(k_n,k_q)$ that can be used in the wave model in the prevailing conditions.

It will be appreciated that the methods and systems provided herein are not only limited to rotating radar measurements as described for FIG. 5. The methods and systems described herein can also be applied to extract sea model coefficients for other measurements from rotating sensing technology, such as Lidar.

The proposed approach can readily process the radar measurements in their natural helical distribution with no approximation and/or interpolation.

Additionally, the proposed approach exploits redundancy in the computations between adjacent beams to reduce the number of computational operations. The approach capitalises on the Nyquist sampling requirement of the polar data representation.

For example, for a sea model that represents a full scan of a wavefield, an exemplary factor-2 subsampled sea model of the full scan can sufficiently represent half the scan. Thus, by dividing the scan in two halves, each coefficient in the two subsampled sea models can be obtained using half a scan (i.e., using half the number of radar beams). The two subsampled models can then be up-sampled and combined using a relatively small number of operations. As the order of computations of mixed space-time approaches depend on the number of beams used in the calculation, this data segmentation leads to a reduction in the order of operations by 2.

More generally, by segmenting a scan along the azimuth direction into 2L wedges, the order of computations can be reduced by L. In theory, the value of L could be set to L=R/2. However, in practice, there is computational cost in up-sampling and accumulating the subsampled sea models, which would offset the gain in the further segmentation. Therefore, in practice, a reasonable/suitable value for L can be chosen with a small amount of trial testing depending on the processing hardware and the radar measurements size.

Figure 9:
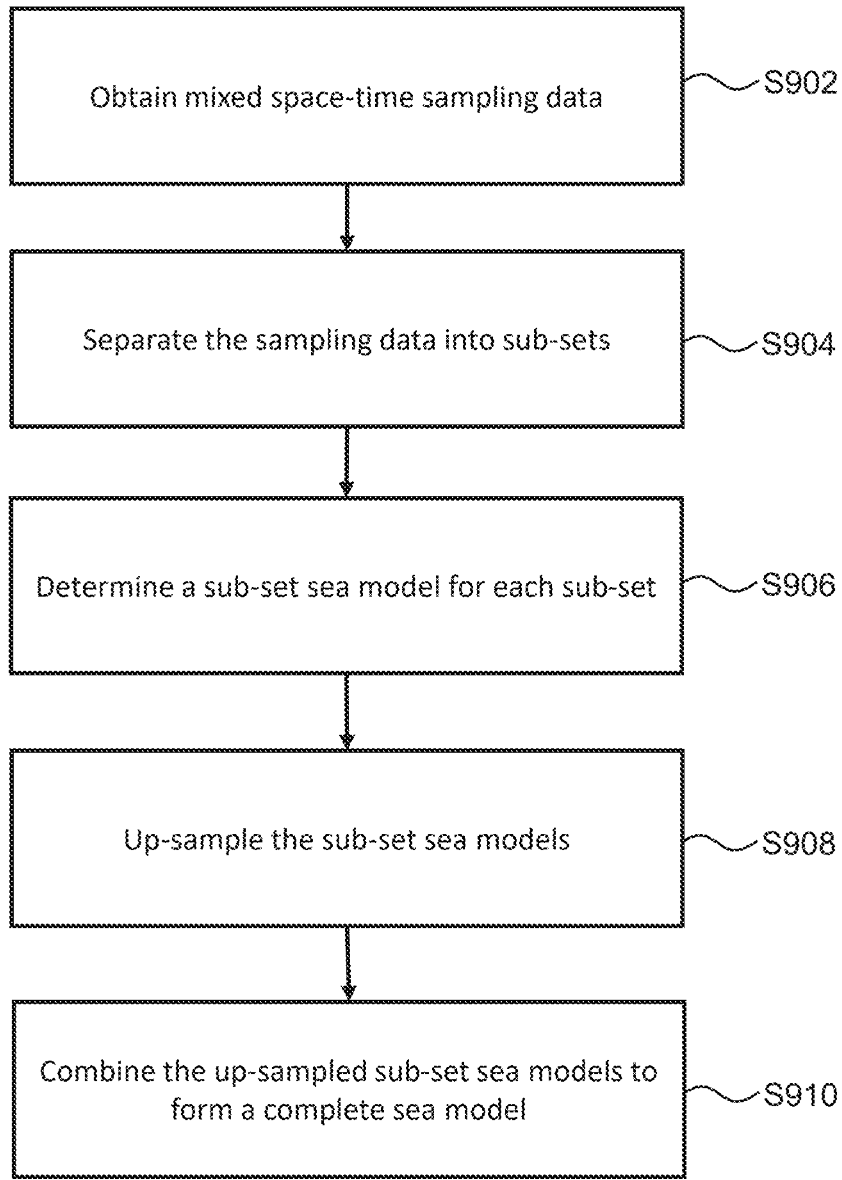
FIG. 9 shows a method for deterministic sea wave profiling and/or prediction

FIG. 9 shows a method for deterministic sea wave profiling and/or prediction. Mixed space-time sampling data of the sea is obtained S902, where the sampling data is helical in time and space and comprises a plurality of beam waveforms. The sampling data is separated S904 into a plurality of sub-sets of the sampling data, where each sub-set of the sampling data corresponds to a region of the sea. For each sub-set of the sampling data, a sub-set sea model is determined S906 using a subsampled set of wavenumbers. Determining the sub-set sea model is based on the beam waveforms in the corresponding sub-set of the sampling data. The sub-set sea models are up-sampled S908 and then combined S910 to form a complete sea model. It will be appreciated than all steps of the method shown in FIG. 9 can be performed by a processing system (e.g. including one or more of a central processing unit CPU, a graphics processing unit GPU, etc.).

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing system. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing system. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

While certain embodiments have been described, these embodiments have been presented by way of example only and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The invention claimed is:

1. A method for deterministic sea wave profiling and/or prediction, the method comprising:
- obtaining mixed space-time sampling data of the sea, wherein the sampling data is helical in time and space and comprises a plurality of beam waveforms;
- separating the sampling data into a plurality of sub-sets of the sampling data, wherein each sub-set of the sampling data corresponds to a region of the sea;
- for each sub-set of the sampling data, determining a sub-set sea model, using a subsampled set of wavenumbers, based on the beam waveforms in the corresponding sub-set of the sampling data;
- up-sampling the sub-set sea models; and
- combining the up-sampled sub-set sea models to form a complete sea model.

2. The method of claim 1, wherein up-sampling each sub-set sea model comprises up-sampling each sub-set sea model in the frequency domain.

3. The method of claim 1, wherein the sub-set sea models are up-sampled by a factor of two.

4. The method of claim 3, wherein combining the sub-set sea models to form a complete sea model comprises iteratively summing four adjacent up-sampled sub-set sea models.

5. The method of claim 1, wherein the sampling data is separated into $L^2$ sub-sets of the sampling data, where $L=2^d$ and d is an integer number.

6. The method of claim 1, wherein separating the sampling data into one or more sub-sets of the sampling data comprises separating the sampling data along the azimuth axis into two or more wedges.

7. The method of claim 6, further comprising, for each of the two or more wedges, separating the wedge along the radial axis into two or more annular wedges such that each sub-set of the sampling data is an annular wedge.

8. The method of claim 6, wherein the sampling data is separated into 2L wedges and L/2 annular wedges per wedge, where L is an integer number.

9. The method of claim 1, further comprising:

determining a set of wavenumbers based on a pre-determined size and/or pre-determined resolution of the complete sea model to be formed; and subsampling the set of wavenumbers to form the sub-sampled set of wavenumbers.

10. The method of claim 1, wherein determining the sub-set sea model comprise solving a linear oceanographic wave model for the corresponding sub-set of the sampling data.

11. The method of claim 1, wherein the sampling data comprises radar data obtained from a rotating radar scanner.

12. A non-transitory computer readable medium comprising instructions which, when executed on a processing system, causes the processing system to perform all the steps of the method of claim 1.

13. A system for deterministic sea wave profiling and/or prediction using mixed space-time sampling data of the sea when the sampling data is helical in time and space and comprises a plurality of beam waveforms, the system comprising a processing system configured to:

obtain the mixed space-time sampling data of the sea;

separate the sampling data into a plurality of sub-sets of the sampling data, wherein each sub-set of the sampling data corresponds to a region of the sea;

for each sub-set of the sampling data, determine a sub-set sea model, using a subsampled set of wavenumbers, based on the beam waveforms in the corresponding sub-set of the sampling data;

up-sample the sub-set sea models; and combine the up-sampled sub-set sea models to form a complete sea model.

14. The system of claim 13, wherein the processing system is configured to up-sample each sub-set sea model by up-sampling each sub-set sea model in the frequency domain.

15. The system of claim 13, wherein at least one of the sub-set sea models are up-sampled by a factor of two or the sub-set sea models are up-sampled by a factor of two and the processing system is configured to combine the sub-set sea models to form a complete sea model by iteratively summing four adjacent up-sampled sub-set sea models.

16. The system of claim 13, wherein the processing system is configured to separate the sampling data into one or more sub-sets of the sampling data by separating the sampling data along the azimuth axis into two or more wedges.

17. The system of claim 16, wherein the processing system is configured to separate the sampling data into 2L wedges and L/2 annular wedges per wedge, where L is an integer number.

18. The system of claim 13, wherein the processing system is further configured to:

determine a set of wavenumbers based on a pre-determined size and/or pre-determined resolution of the complete sea model to be formed; and subsample the set of wavenumbers to form the sub-sampled set of wavenumbers.

19. The system of claim 13, wherein the processing system is configured to determine the sub-set sea model comprise solving a linear oceanographic wave model for the corresponding sub-set of the sampling data.

20. The system of claim 13, further comprising a rotating radar scanner configured to obtain the sampling data.

* * * * *